(No Model.)
P. McFADDEN.
HARNESS SADDLE TREE.
No. 316,801. Patented Apr. 28, 1885.
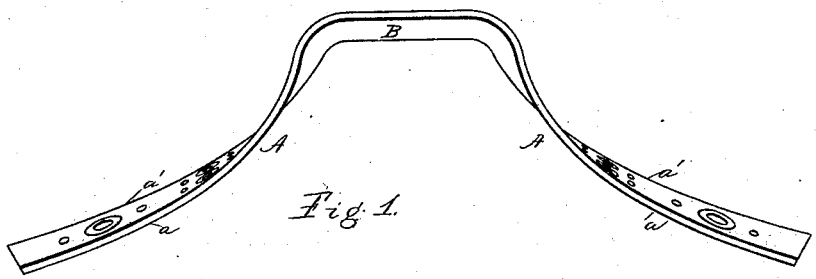
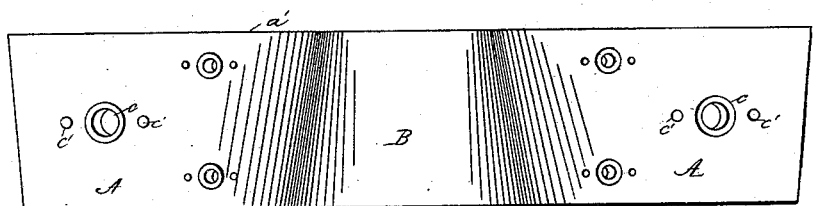
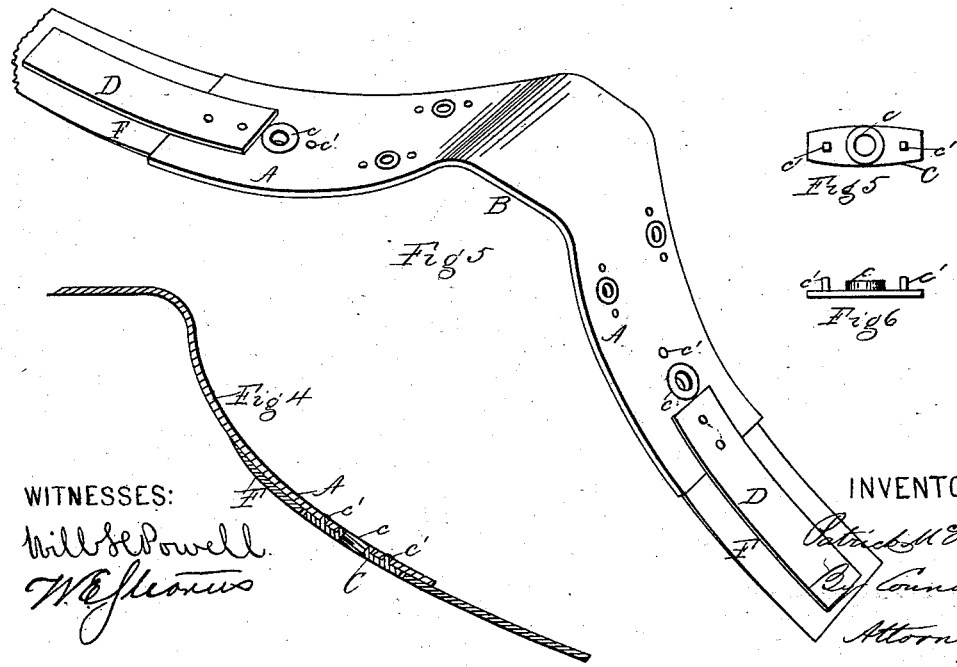
WITNESSES:
Will B. Powell
W. E. Shorus
INVENTOR
Patrick McFadden
By Connolly Bro
Attorneys

UNITED STATES PATENT OFFICE.

PATRICK McFADDEN, OF PHILADELPHIA, PENNSYLVANIA.

HARNESS-SADDLE TREE.

SPECIFICATION forming part of Letters Patent No. 316,801, dated April 28, 1885.

Application filed November 29, 1884. (No model.)

*To all whom it may concern:*

Be it known that I, PATRICK McFADDEN, a citizen of the United States, residing at Philadelphia, in the county of Philadelphia and State of Pennsylvania, have invented certain new and useful Improvements in Harness-Saddle Trees; and I do hereby declare the following to be a full, clear, and exact description of the invention, reference being had to the accompanying drawings, which form part of this specification, in which—

Figure 1 is a front elevation of saddle-tree. Fig. 2 is a plan of same. Fig. 3 is a perspective showing stiffeners and shoes. Fig. 4 is a vertical detail section. Fig. 5 is a plan of burr. Fig. 6 is a side elevation of burr.

My invention has relation to harness-saddles, and has for its principal object so to construct such saddles that they will fit truly on horses' backs, in order to maintain their proper position thereon and to avoid injury thereto.

My improvements relate specially to the tree of a harness-saddle; and they consist, first, in making the same curved, in the manner hereinafter detailed; second, in the combination, with the tree of a harness-saddle, of burrs of peculiar construction riveted thereto for the reception of the terret-posts; and, third, in certain details of construction, hereinafter fully set forth and specifically claimed.

Referring to the accompanying drawings, the figures therein illustrate my improvements. The tree therein shown differs from previous harness-saddle trees in this, that the sides or legs A A of mine, instead of being shaped as heretofore, are curved, as shown, the curves being concavo as viewed from the top or edge—that is, curving inwardly from the bridge or apex B toward the lower ends of the sides or legs, where the stiffeners D D are attached. There is also a further curve in the said sides or legs, resulting from this, that the curvature of the front edges, $a\ a$, is different from and of less radius than that of the rear edges, $a'\ a'$; or, in other words, the dip of the curve of the front edge is more pronounced than that of the rear edge, and the front of the tree at the bridge is wider than the rear, said tree falling or sloping below the bridge from the rear edge to the front edge, as shown. This curvature of the tree causes it to conform to the shape of a horse's back, and the saddle formed on this tree, partaking of such curvature, will fit more truly and comfortably than one formed as heretofore.

The tree may be made of any suitable material, but is preferably constructed of a steel plate, duly stamped into shape and tempered so as to be elastic. Such a plate, while very light and elastic, is too thin to permit the formation in it of openings of sufficient depth to afford due support to the terret-posts, &c.; hence to afford such support I rivet burrs or nuts C C, of adequate depth, to the tree-plate, openings being cut in said plate to register with the screw-holes $c$ in the burrs, and to permit the passage of the rivets $c'\ c'$.

Common burrs or nuts of any shape may be employed, and be fastened by separate rivets passed through the same and through the tree-plate; or, if desired, and this I prefer, cast burrs of oblong shape and having central projecting bosses internally threaded, and rivet-studs at either end, as shown in Figs. 5 and 6, may be employed, the tree-plate being formed with openings of corresponding shape to receive the burr-bosses and rivet-studs, the latter being riveted after the burrs are placed in position on the under side of the said plate.

To make a smooth or plane surface on the under side of the tree-plate, shoes F F, of leather, equal in thickness to the depth of the burrs, and with openings in which the burrs fit, are riveted, as shown, inside the legs or sides of the saddle-tree.

What I claim as my invention is as follows:

1. A harness-saddle tree the sides or legs of which have concavo curves trending inwardly from the apex or bridge, and which are also curved from the front to the rear edge, the dip of the front curves being greater than that of the rear curves, substantially as shown and set forth.

2. In combination with a harness-tree plate the sides or legs of which have concavo curves trending inwardly from the apex, and which are also curved from the front to the rear edge, having openings for the reception of the same, burrs or nuts having projecting threaded bosses and rivet-studs integral therewith, substantially as shown and set forth.

3. The combination, with a harness-saddle tree the sides or legs of which have concavo curves trending inwardly from the apex, and which are also curved from the front to the rear edge, having burrs or nuts secured on its inner or under side, of shoes, also secured to said inner or under side and having openings for said burrs or nuts, substantially as shown, and for the purpose set forth.

In testimony that I claim the foregoing I have hereunto set my hand this 20th day of November, 1884.

PATRICK McFADDEN.

Witnesses:
LISLE STOKES,
WILL H. POWELL.